(12) United States Patent
Schiller et al.

(10) Patent No.: US 9,984,480 B2
(45) Date of Patent: May 29, 2018

(54) ENHANCING CURVES USING NON-UNIFORMLY SCALED CUBIC VARIATION OF CURVATURE CURVES

(71) Applicant: Adobe Systems Incorporated, San Jose, CA (US)

(72) Inventors: Stephen Schiller, Oakland, CA (US); Nathan Carr, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 127 days.

(21) Appl. No.: 15/076,423

(22) Filed: Mar. 21, 2016

(65) Prior Publication Data

US 2017/0270696 A1 Sep. 21, 2017

(51) Int. Cl.
G06T 11/20 (2006.01)
G06F 17/24 (2006.01)

(52) U.S. Cl.
CPC .......... *G06T 11/203* (2013.01); *G06F 17/242* (2013.01)

(58) Field of Classification Search
None
See application file for complete search history.

(56) References Cited

U.S. PATENT DOCUMENTS

| | | | | |
|---|---|---|---|---|
| 7,196,707 B2 * | 3/2007 | Davignon | ............. | G06T 11/203 345/442 |
| 2005/0237325 A1 * | 10/2005 | Motter | .................. | G06T 11/203 345/442 |
| 2008/0005212 A1 * | 1/2008 | Levien | .................. | G06T 11/203 708/275 |
| 2010/0097382 A1 * | 4/2010 | Nystad | .................. | G06T 11/203 345/442 |
| 2011/0164041 A1 * | 7/2011 | Miura | .................... | G06T 11/203 345/442 |
| 2015/0062129 A1 | 3/2015 | Wilensky et al. | | |

OTHER PUBLICATIONS

"Curves and Surfaces for Computer Aided Design," Gerald Farin, Academic Press, 1998.
"From Spiral to Spline: Optimal Techniques in Interactive Curve Design", Raphael Linus Levien, PhD Thesis submitted to University of California at Berkeley, Fall 2009.
"Curve Fitting with Piecewise Parametric Cubics", Stone and Plass, Computer Graphics vol. 17, No. 3 (published by ACM), Jul. 1983.

* cited by examiner

*Primary Examiner* — Ryan M Gray
(74) *Attorney, Agent, or Firm* — Keller Jolley Preece

(57) ABSTRACT

The present disclosure is directed to generating enhanced curves that are aesthetically pleasing. To create enhanced a curve that is aesthetically pleasing, a curve enhancement system uses non-uniformly scaled cubic variation of curvature (CVC) curves. For example, the curve enhancement system non-uniformly scales a curve in a spline. Based on the scaling, the curve enhancement system can generate CVC curves having the desired end point constraints. Then, using the end point constraints, the curve enhancement system can inversely downscale the non-uniform scaled curve while maintaining the end point constraints from the CVC curves to achieve an enhanced curve in the spline.

20 Claims, 9 Drawing Sheets

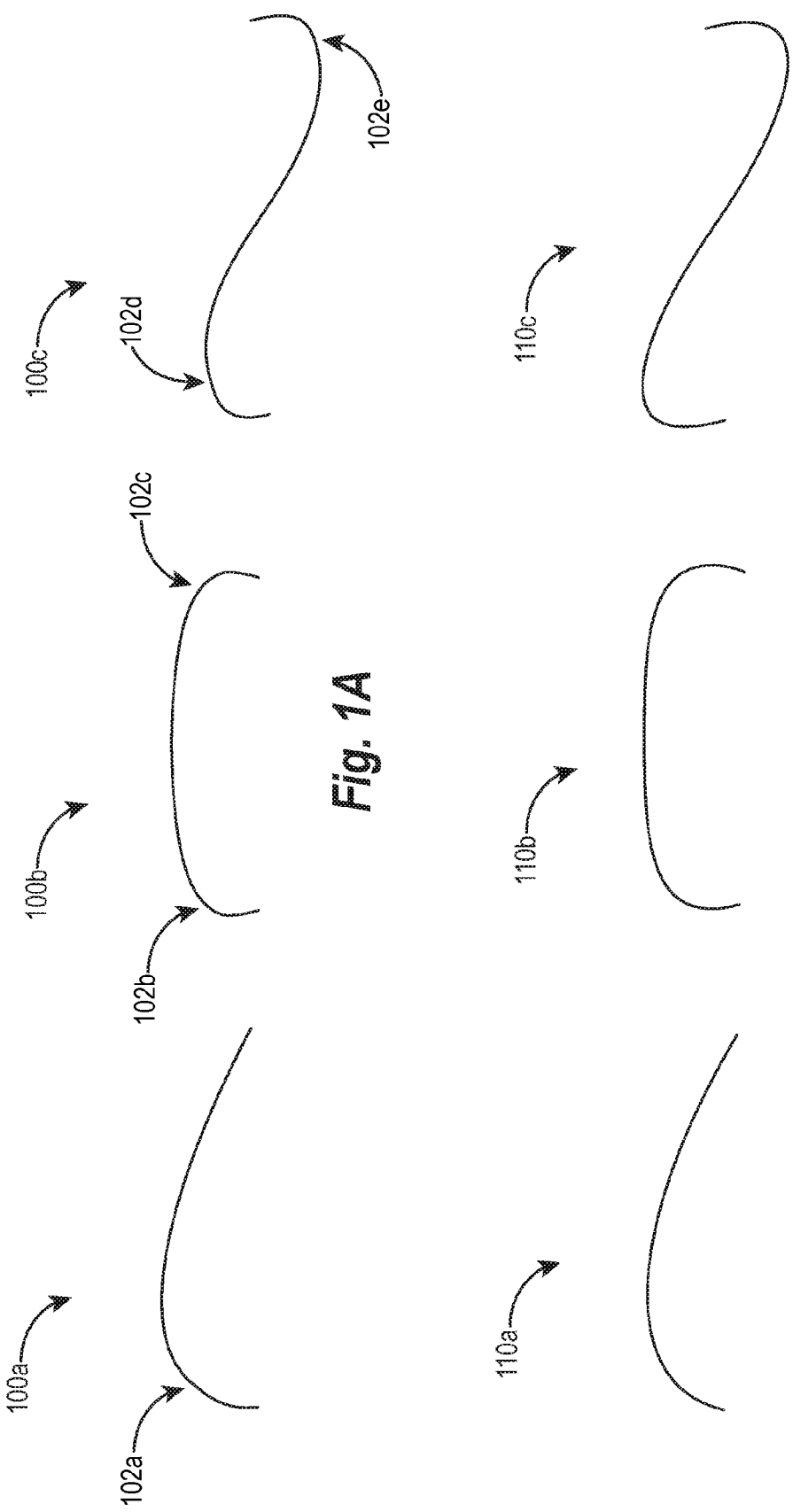

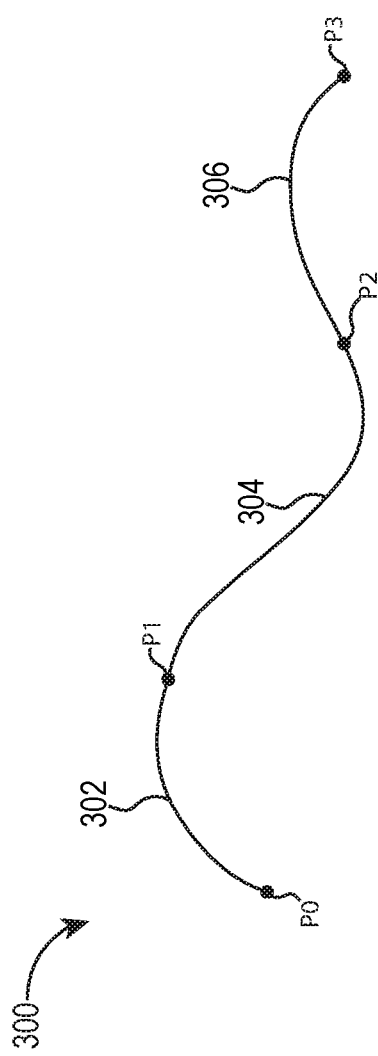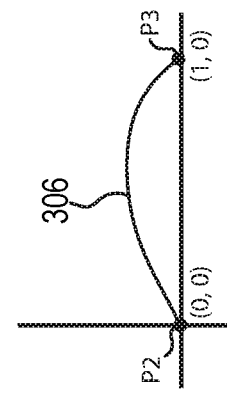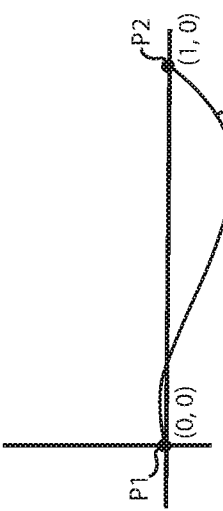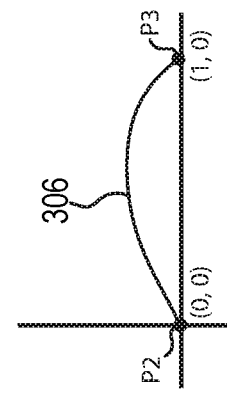
Fig. 3A
Fig. 3B
Fig. 3C
Fig. 3D

ENHANCING CURVES USING NON-UNIFORMLY SCALED CUBIC VARIATION OF CURVATURE CURVES

BACKGROUND

1. Technical Field

One or more embodiments of the present disclosure relate generally to curve editing systems. More specifically, one or more embodiments of the present disclosure relate to systems and methods for enhancing curves by using non-uniformly scaled cubic variation of curvature (CVC) curves.

2. Background and Relevant Art

Conventional curve editing systems enable users to design smooth curves for purposes such as free form illustration, engineering design, or other types of technical or non-technical drawing. Curves generated by these conventional systems are often referred to as "splines." A spline is a continuous curve made up of smaller curve elements called "curve primitives" (or simply "curves"). Curve primitives are smoothly joined end to end in a spline so that the spline appears as one long continuous curve. Conventional systems compute each curve primitive as a compact mathematical equation using a fixed number of parameters. For example, conventional systems often define a conic curve using five parameters, a quadratic Bézier curve using six parameters, and a cubic Bézier curve using eight parameters.

As an overview, conventional systems provide a user interface that enables users to specify spines by interacting with a display and an input device. Typically, conventional systems enable a user to edit (e.g., create and drag) discrete points, which in turn, control the shape of the spines. Hence, these discrete points are called control points. Control points can include interpolated control points and non-interpolated control points. Interpolated control points are located on a curve and directly constrain the curve. Non-interpolated control points control the tangent to the curve and are associated with a nearby interpolated control point. Moving a non-interpolated control point, changes the direction of the curve at the associated interpolated control point. As used herein, an interpolated control point can be an end point or an intermediary control point.

One problem with simpler conventional systems, ones that use only interpolated control points, is that such systems have to supply tangent angles at the control points. It is often difficult to supply tangent angles that anticipate the user's desires, which causes some of the drawbacks of such systems. Some conventional systems have recently improved the ability to draw and create curves and splines. For example, these systems use Bézier curves in attempts to create natural looking curves. In some cases, these conventional systems use quadratic Bézier curve fit to control points within a curve to achieve a better looking curve. Despite these improvements, such conventional systems still suffer from a number of drawbacks.

As one example of a drawback, these conventional systems typically only provide G1 continuity for a spline. "G1 continuity" refers to a measure of curve smoothness where two curves connect (typically in a spline) such that the tangent angles of the two curves match at the connection. Curves in a spline, however, can achieve G2 continuity, where the curvature in also continuous across different curves in a spline. More specifically, "G2 continuity" refers to a measure of curve smoothness where two different curves connect such that both the tangent angles and the curvatures of the two curves match at the connection. Splines with G2 continuity often have more an aesthetic appeal than splines with only G1 continuity because the curvature of G2 continuity curves tend to change more gradually. Many applications, including some engineering applications, require G2 continuity in curves, which many conventional systems cannot provide.

As another example of a drawback, some conventional systems that use Bézier curves place control points in the center of a curve primitive. As a result, the curve between two control points consists of two halves of two quadratic Bézier curves. This can result in a conflict with existing systems, which require one primitive between control points. As a result, this issue makes backwards compatibility more difficult.

As a further problem, conventional systems that use Bézier curves often return unsuitable results. In particular, cubic Bézier curves each theoretically have enough degrees of freedom to set both the tangent and curvature at both end points. In reality, however, after the end points and tangent directions are fixed in a Bézier curve, the remaining degrees of freedom are constrained by the solutions of a quartic polynomial equation. This can result occasionally in more than one valid solution, or in some cases, no valid solutions (e.g., not all roots of the polynomial are real or the roots do not align with the curve direction). Conventional systems often break or fail when provided with one of these unsuitable solutions.

Moreover, even when conventional systems arrive at a correct result for a curve, the curve is sometimes not fair. As used herein, "fair" or "fairness" refers to the aesthetic look of a curve. A "fair" curve looks pleasing and aesthetic to the eye. The terms "roundness" and "fullness" can also be used to describe the fairness of a curve. Fairness is heuristically achieved by minimizing the amount of change if curvature in a curve. The term "curvature" refers to the rate of change of a tangent angle of the curve as a function of arc length. For example, for a circle of radius R the curvature is constant at 1/R. Intuitively the higher the curvature is at a point, the more sharply the curve turns at that point. Note, that curvature can be positive or negative. Conventionally, a curve whose direction is changing in a counter-clockwise direction as one travels along the curve is positive and changing in a clockwise direction is negative. As mentioned above, conventional systems can provide a cubic curve that is not fair in high-curvature curves because the curvature can vary too quickly along the curve. In other words, even when a conventional system can produce a curve with G2 continuity, the conventional system can produce curves that are not aesthetically pleasing or fair.

Thus, these and other problems exist with regard to creating and enhancing curves.

BRIEF SUMMARY

Embodiments of the present disclosure include systems and methods for generating enhanced curves. More specifically, the disclosed systems and methods generate enhanced curves by using non-uniformly scaled cubic variation of curvature (CVC) curves. To illustrate, in one or more embodiments, the disclosed systems and methods detect user input defining points of a curve in a spline. The systems and methods non-uniformly scale the curve in a single direction to enhance the curvature of the curve within the spline. The systems and methods then compute multiple CVC curves corresponding to the non-uniformly scaled curve. As part of computing the multiple CVC curves, the systems and methods identify new end points constraints based on the non-uniformly scaled curve. The systems and methods then downscale the non-uniformly scaled curve while maintaining the new end points constraints to generate an enhanced curve that is fuller and fairer. If a spline includes multiple curves, the systems and methods can individually enhance each curve in the spline, if needed, to create a richer, fuller, and fairer spline.

Accordingly, the disclosed systems and methods provide improved fairness to a curve in a spline by reducing the rate of change in curvature of one or more curves in the spline. In particular, by using new curve primitives with non-uniformly scaled CVC curves, the systems and methods improve fairness in a curve in a spline. In addition, the systems and methods can achieve G2 continuity at both the end points for the internal points (i.e., where two curves in a spline connect) of enhanced curves in a spline.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 1A-1B illustrate example comparisons between non-enhanced curves and enhanced curves in accordance with one or more embodiments;

FIGS. 3A-3D illustrates an example of a spline with multiple curves where each curve is non-uniformly stretched in a separate canonical coordinate system in accordance with one or more embodiments;

DETAILED DESCRIPTION

Figure 2A:
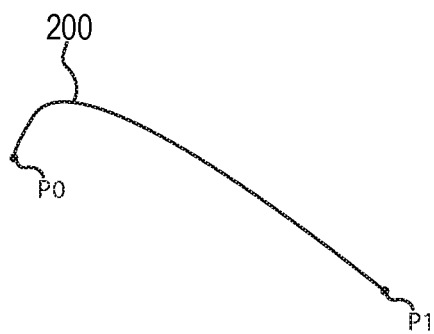
FIGS. 2A-2I illustrate an example process of enhancing a curve in a spline having one or more curve primitives in accordance with one or more embodiments.

One or more embodiments of the present include a curve enhancement system that improves the fairness of curved splines. More specifically, one or more embodiments of the curve enhancement system use non-uniformly scaled cubic variation of curvature (CVC) curves to generate enhanced curves in splines. By using non-uniformly scaled CVC curves, the curve enhancement system generates curves that are fairer and more aesthetically pleasing due to curves appearing properly rounded.

As described in further detail below, the curve enhancement system generates fairer curve primitives based on two control points along with corresponding tangents and curvatures to the two control points. In one or more embodiments, the two control points are end points of a curve in the spline. In some embodiments, the two control points are adjacent control points in a spline, and the tangents and curvatures come from the corresponding tangents and curvatures of the curves in the spline.

To illustrate, in one example embodiment, the curve enhancement system receives user input defining at least a portion of a spline that includes one or more curve primitives (i.e., curves), or at least, receives a set of interpolation control points (e.g., end points) for a curve. The curve enhancement system separately calculates scaling factors for each curve. For each curve, the curve enhancement system non-uniformly scales the curve in a single direction based on the corresponding calculated scaling factor, such as along the y-axis of a canonical coordinate system created for the curve. For each non-uniformly scaled curve, the curve enhancement system computes CVC curves and identifies end point constraints from the CVC curves. The curve enhancement system then downscales (which is used interchangeable with "downscales") each the non-uniformly scaled curve in the spline while maintaining the corresponding identified end point constraints of the CVC curves.

Various embodiments of the curve enhancement system use a new curve primitive in place of cubic Bézier cures to match the tangent angles and curvatures of an inputted curve in a spline. In particular, the curve enhancement system computes one or more new curve primitives that are non-uniformly scaled CVC curves. CVC curves are defined using the cubic polynomial: $k(s)=a \times s^3+b \times s^2+c \times s+d$, where the independent variable s is the arc length of the curve from a fixed reference point on the curve, and where k(s) gives the curvature at the point with arc length s from the reference point. A CVC curve includes four parameters, (a, b, c, and d) which form a template of the CVC curve. These parameters can be translated vertically and horizontally, rotated, and scaled to give the CVC curve a total of eight degrees of freedom, which is the required number of degrees of freedom for a cubic polynomial.

As another note, a CVC curve is approximate to, but more computationally efficient than a minimum variation in curvature curve (or "MVC curve"). A MVC cures has the property of being constrained to given G2 end point constraints while changing curvature as little as possible. In particular, a MVC curve minimizes the integral of the square of rate of change of curvature versus arc length over the length of the curve, under the constraints given a start point, an end point, a start tangent angle, and an end tangent angle. Mathematically, a MVC curve minimizes the following integral:

$$\int_0^L [k'[s]]^2 \delta s$$

where s is arc-length and k'(s) represent the derivative of the curvature with respect to s. Because a MVC curve minimizes the change in curvature, an MVC curve tends to produce fair, aesthetically pleasing curves, and thus, are an ideal choice for creating new curve primitives. A MVC curve, however, is computationally intensive and difficult to accurately compute. As such, embodiments herein use CVC curves as an approximation for MVC curves. One will appreciate that in some instances, MVC curves are used in place of CVC curves in accordance with embodiments disclosed herein.

Both MVC curves and CVC approximation curves, however, are not designed to accommodate large changes in curvature that occur over small distances (e.g., quick transition from a tight bend to a gentle bend). In the case of tight curves, employing either MVC curves or CVC approximation curves add undesired length to the curves between the required changes in curvature. For example, applying MVC or CVC approximation to a curve having a hairpin-turn causes the curve to be enlarged to a big loop to slow down the rate of curvature, which changes the basic shape of the curve. Thus, one or more embodiments described herein increase the flexibility of MVC or CVC curves to accommodate tight turns without significantly changing basic curve shape. For instance, as described below, one or more embodiments employ non-uniformly scaling and/or downscaling to interpolate the end point constraints (e.g., position, angle, and curvature), which results in fairer curves than can be produced using conventional Bézier curves.

To aid in handling the computations associated with MVC and CVC curves, the curve enhancement system uses a canonical coordinate system. In particular, the curve enhancement system separately moves each curve in the spline from an original coordinate system to a customized canonical coordinate system. The curve enhancement system positions each curve to start at the origin (e.g., (0,0)) of the canonical coordinate system. In addition, the curve enhancement system rotates each curve so that the end point of each curve lies on the horizontal axis (e.g., x-axis) of the canonical coordinate system. Further, the curve enhancement system scales each curve to fit between the origin and a first unit (e.g., (1,0)). Then, within the canonical coordinate system, the curve enhancement system performs non-uniform scaling and computes the CVC curves. The use of the canonical coordinate system can simplify calculations and decrease processing time. The decreased processing time reduces latency when rendering enhanced curves.

In some embodiments, the curve enhancement system fits one or more Bézier curves to the generated enhanced curves in a spline. In general, Bézier curves are more common in the drawing and design industry than CVC curves. As such, design applications can easily read and render Bézier curves. In contrast, CVC curves are not as common, and many design applications may not yet be able to read or render CVC curves. Thus, fitting a Bézier curve to the generated enhanced curves in a spline allows the enhanced curves to be universally displayed/used.

When fitting a Bézier curve to a CVC curve, the fitted Bézier curve may not perfectly fit the enhanced curve, however, the fit of the Bézier curve will be a very close approximation. To illustrate, the curve enhancement system tries to match the over-all shape of the Bézier curve to fit the fairer CVC curve primitive, but without explicitly requiring that the curvature match exactly at the end points. In particular, the curve enhancement system sees that the tangent angles match so that G1 continuity is maintained. Further, the curve enhancement system maintains approximate G2 continuity but does not require exact G2 continuity. In this manner, the curve enhancement system produces fairer splines because matching the shape of the downscaled CVC to a Bézier curve tends to cause the Bézier curve to approximately match the curvature of the enhanced curve. Further, while exact G2 continuity is not always achieved, the human eye may not be able to distinguish the difference between approximate G2 continuity and exact or actual G2 continuity when viewing the fitted curve in a spline.

Additional features and characteristics of one or more embodiments of a document organization system are described below with respect to the Figures. FIGS. 1A-1B illustrate example comparisons between non-enhanced curves 100a-c and enhanced curves 110a-c in accordance with one or more embodiments. The lines in FIGS. 1A-1B are shown as cubic Bézier curves. As mentioned, a cubic Bézier curve is a parametric curve that uses eight degrees of freedom to define the parameters of the curve. As such, a cubic Bézier curve often appears as a spline having one or more curve primitives.

FIG. 1A shows three non-enhanced curves 100a-c. Upon close inspection, the ends of the three non-enhanced curves 100a-c appear misshaped. To illustrate, the first non-enhanced curve 100a has a first end 102a where the non-enhanced curve 100a flattens out. The second non-enhanced curve 100b includes two ends 102b and 102c that appear slightly misshapen. In particular, the two ends 102b and 102c appear pointy near the end points and flattened near the center, which occurs when the curvature varies too quickly near the end points. Likewise, the third non-enhanced curve 100c also include two ends 102d and 102e that appear slightly misshapen.

As mentioned above, the distortion of a curve occurs when the drawing application providing the curve slightly misaligns the maximum curvature point in the curve and transitions the curve too quickly. Even if the drawing application correctly aligns the maximum curvature point of a curve a majority of the time, an artist using the drawing application can get frustrated each time the drawing application produces a misshapen curve. Further, an artist's frustration with the drawing application is sustained knowing that eventually the drawing application is going to produce a misshapen curve.

In contrast to the three misshapen non-enhanced curves 100a-c in FIG. 1A, FIG. 1B illustrates three corresponding enhanced curves 110a-c. The three enhanced curves 110a-c are curves each created using embodiments of the curve enhancement system described herein. As shown, the enhanced curves 110a-c appear more round, full, and fair. For example, the enhanced curves 110a-c do not transition too quickly (i.e., the curves do go from a circle shape to a mostly flat shape and back to a circle shape without sufficient transition), but rather the curve enhancement system minimizes the curvature of the curves (i.e., the curvature changes more gradually) to produce a rich and full curve that is more aesthetically pleasing.

FIGS. 2A-2I illustrate an example process of generating an enhanced curve (i.e., curve primitive) in a spline in accordance with one or more embodiments. More specifically, FIGS. 2A-2I show an example process the curve enhancement system employs to create an enhanced curve that is part of a spline. FIGS. 2A-2I visually illustrate the process of creating an enhanced curve. One will appreciate in light of the disclosure herein that in use, the curve enhancement system may generate only the enhanced curve. Thus, the intermediate steps/curves shown in FIGS. 2A-2I may not be expressly generated but rather may be only mathematical computations as part of the process in generating the enhanced curve. Further, the intermediate steps/curves shown in FIGS. 2A-2I are for illustrative purposes only and are not meant to limit any particular embodiment.

Figure 2B:
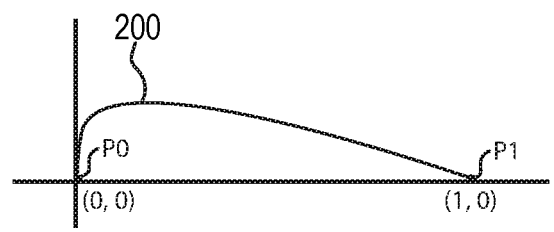
Figure 2C:
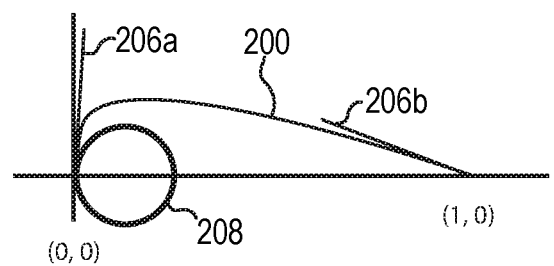
Figure 2D:
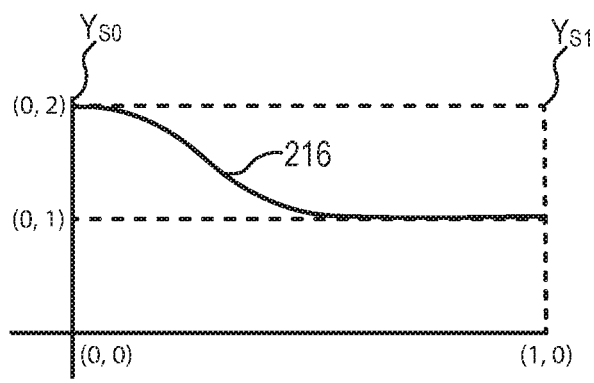
Figure 2E:
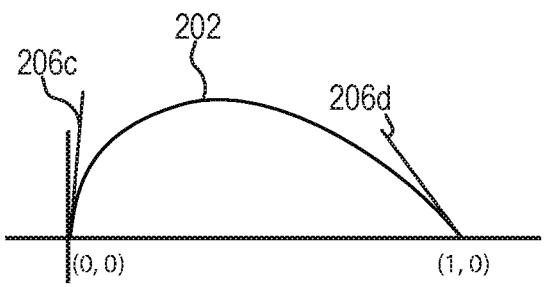
Figure 2F:
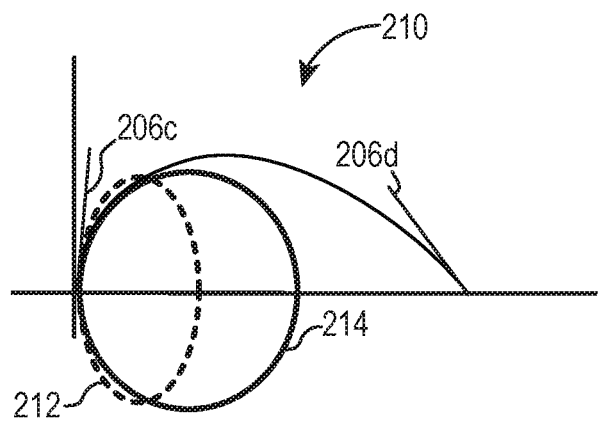
Figure 2G:
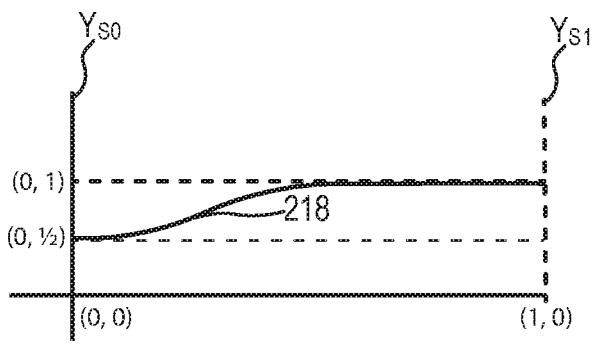
Figure 2H:
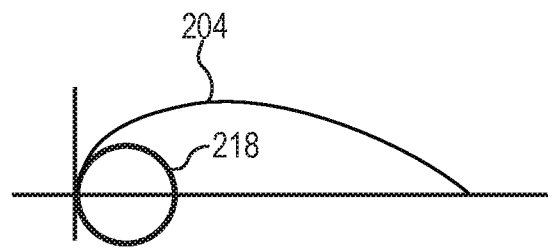
Figure 2I:
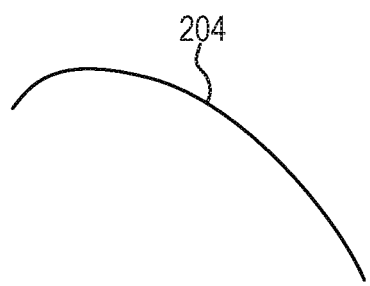

As an overview of FIGS. 2A-2I, the curve enhancement system receives user input defining at least two control points of an input curve that is part of a spline (FIG. 2A). The curve enhancement system rotates the input curve and translates the input curve from an original coordinate system to a canonical coordinate system (FIG. 2B). Using the canonical coordinate system, the curve enhancement system identifies the curve primitives in the input curve (FIG. 2C) and non-uniformly scales the input curve in one direction (FIG. 2E) to create scaled CVC curves (FIG. 2F). Next, the curve enhancement system downscales the non-uniformly scaled curve (FIG. 2G) while maintaining end point constraints of the CVC curves to generate an enhanced curve (FIG. 2H). The curve enhancement system then rotates the enhanced curve back to its original orientation and renders the enhanced curve (or a Bézier curve fitting) in the original coordinate system (FIG. 2I).

As briefly mentioned, in FIG. 2A, the curve enhancement system receives user input defining an input curve 200, which is a parabolic curve in the embodiment shown in FIG. 2A. In some embodiments, the input is a cubic curve. The input can include, in the least, a starting control point and an ending control point, which can be used to form a curve. For example, the curve 200 starts at a first end point P0 and ends at a second end point P1. The two end points P0 and P1 serve as control points, which provide information about the location as well as the direction of the curve 200 and curvature with respect to the end points. For purposes of explanation, FIG. 2 will be described using a curve as the user input, however, one will appreciate that the curve enhancement system can perform the same functions described in connection with FIG. 2 with existing curves using the two end points P0 and P1, along with corresponding tangents and curvatures.

In one or more embodiments, the curve enhancement system may be a component within a drawing and/or design application on a client device that enables a user to provide user input to create lines, shapes, and designs. In other embodiments, the curve enhancement system may be separate from the drawing and/or design application and reside elsewhere on the same client device or on another client computing (e.g., on a server device). In some embodiments, the curve enhancement system may be a hardware component on a computing device.

The curve enhancement system, in various embodiments, may not display the curve 200 to the user until the curve has been enhanced and/or added to a spline with other enhanced curves. The process of enhancing a curve in a spline, however, may occur quickly enough such that the user does not realize that the curve enhancement system is enhancing the curve. Rather, the user provides input defining a curve and the curve enhancement system consistently provides the user with an aesthetically pleasing curve as expected by the user without noticeable latency.

The curve enhancement system provides a user with a digital canvas within an original coordinate system. As used herein, an "original coordinate system" refers to a system that uses one or more numbers, or coordinates, to uniquely determine the position of a point or other geometric element. An example of an original coordinate system is a simply two-axes (x,y) Cartesian coordinate system having an origin at (0,0).

In FIG. 2B, the curve enhancement system positions the curve 200 within a canonical coordinate system. The canonical coordinate system is also a simply two-axes (x,y) Cartesian coordinate system having an origin at (0,0). A canonical coordinate system, however, is customized for each enhanced curve in a spline. Thus, when a spline includes multiple curves to be enhanced, the curve enhancement system generates a new and customized canonical coordinate system for each curve in the spline that is to be enhanced. To illustrate, in a canonical coordinate system, the first end point of a curve (i.e., P0) corresponds to the origin (0,0). The second endpoint of the curve (i.e., P1) corresponds to (1,0) on the x-axis, as described below. By generating a customized canonical coordinate system for each curve, the curve enhancement system can non-uniformly stretch the curve in a single direction relative to the y-axis of the particular coordinate system.

In moving a curve (e.g., curve 200) from the original coordinate system to the canonical coordinate system, the curve enhancement system translates the curve by −P0 (e.g., moves the first end point P0 to the origin (0,0) of the canonical coordinate system). In addition, the curve enhancement system rotates the curve so that P1 lies on the x-axis of the canonical coordinate system to the right of the origin. Thus, the curve starts at the origin of the canonical coordinate system and travels in the positive direction (i.e., to the right of the origin).

Furthermore, as part of moving a curve, the curve enhancement system scales the curve by 1/B, where B is the distance between the first end point P0 and the second end point P1. In other words, the curve enhancement system sets the x-coordinates value to equal the horizontal length of the curve (measured from the first end point P0 to the second end point P1) such that the curve runs from the origin (0,0) to the first x-coordinates (1,0). As mentioned above, the curve enhancement system creates a different canonical coordinate system for each curve having a pair of adjacent control points. FIG. 2B illustrates the curve enhancement system having positioned the curve 200 from the original coordinate system in FIG. 2A to a canonical coordinate system.

As shown in FIG. 2C, using the canonical coordinate system, the curve enhancement system identifies the curvature of the curve 200. For the purposes of explanation, tangent angle lines 206a and 206b and oscillating circle 208 have been visually added to FIG. 2C to illustrate the curvature of curve 200, particularly at the first end point P0; however, the curve enhancement system may, in some embodiments, determine the curvature without using osculating circles and/or tangent angle lines. In other words, in various embodiments, osculating circles serve as an illustrative aid. As used herein, an "osculating circle" refers to a circle at an end point of a curve that is tangent to curve at the end point. An osculating circle has a radius $1/k(t)$, where $k(t)$ represents the curvature of a curve at position t. As such, an osculating circle is a circle that mostly closely approximates the curve at an end point (e.g., end point P0 or P1) of a curve, as both the tangent angle and the curvature of the osculating circle matches that of the corresponding curve. In other words, an osculating circle matches the curve in both a first derivative (i.e., angle) and a second derivative (i.e., curvature) at an end point, and thus, is a good local G2 approximation to the corresponding curve.

The curve enhancement system then non-uniformly scales the curve 200 in the y-direction of the canonical coordinate system using a y-scaling factor to compute a curve with desired angles and curvatures at the end points P0, P1. The curve enhancement system employs a variable y-scaling scale factor where s varies depending on the x-axis. For example, the curve enhancement system identifies the angle of the tangent for a particular x-coordinate (e.g., the beginning point or end point of the curve) and uses the angle of the tangent to determine a scaling factor s for the corresponding y-coordinate. For instance, given the tangent angle of an x-coordinate, the curve enhancement system applies a trigonometric function and/or cubic equation to determine the scaling factor s (or reciprocal scaling factor 1/s) to apply to the corresponding y-coordinate. In various embodiments, the canonical coordinate system also employs curvature values, a baseline value, and/or a constant value to determine the y-scaling scale factor.

FIG. 2D illustrates a scaling factor s for the curve 200. The curve enhancement system determines the value of the scaling factor for x-values in between 0 and 1, or put another way, from the first end point P0 to the second end point P1. The scaling factor s in connection with the first end point P0 and the second end point P1 are labeled $Y_{S0}$ and $Y_{S1}$ respectively in FIG. 2D. In various embodiments, the scaling factor s is blended between $Y_{S0}$ and $Y_{S1}$, for example, using a smooth blending function, or blending function as described below.

Before applying a scaling factor to the curve, in one or more embodiments, the curve enhancement system tests to determine whether using non-uniformed scaled CVC curves would be beneficial in generating fairer curves. For example, the curve enhancement system compares the radius of an osculating circle to a baseline distance V (i.e., the distance of travel along the corresponding curve) to determine high-curative cases. For instance, if the radius of an osculating circle is smaller than one-sixth of the baseline (B) distance, the curve enhancement system employs non-uniform scaled CVC curves, and downscaling to generate more aesthetically pleasing curves. Otherwise, the curve enhancement system uses conventional CVC curves to generate a non-enhanced curve. In some embodiments, the curve enhancement system uses one-fourth the distance rather than one-sixth the distance as the baseline distance when testing whether to employ non-uniform scaling, CVC curves, and downscaling.

In some embodiments, the curve enhancement system focuses on a value of the scaling factor s near the first end point P0 of the curve (0,0) and near the second end point P1 of the curve (1,0). For example, as shown in FIG. 2D, the scaling factor s is around 2 at $Y_{S0}$, while at the middle of the curve x≈0.5, the scaling factors is near 1, which indicates no scaling. Near the second end point, the scaling factor s flatten out. In other words, the curve enhancement system will apply a larger scaling factor s at the end points of the curve, with scaling near the first end point P0 being larger than scaling near the second end point P1, in proportion to the scaling factor s shown in FIG. 2D.

FIG. 2E shows a scaled curve 202 scaled non-uniformly in a single direction based on the scaling factor s shown in FIG. 2D. Because the scaled curve 202, in this example, has increased in the y-direction, the scaled curve 202 appears to be taller, and thus, more round near the first end point P0 and the second end point P1 than the curve 200 shown in FIG. 2C. To illustrate, the altered tangent angle lines 206c and 206b are more vertical than the original tangent angle lines 206a and 206b of the pre-scaled curve 200 shown in FIG. 2C, where more vertical tangent angle lines indicate a reduced rate of curvature change of a curve, and hence, a fairer curve.

FIG. 2F shows CVC curves 210 created based on the scaled curve 202 in FIG. 2E. FIG. 2F also shows a scaled osculating circle. In particular, the curve enhancement system non-uniformly scales the osculating circle 208 (FIG. 2C) in the y-direction in connection with non-uniformly scaling the curve to form an osculating ellipse 212. The curve enhancement system then rounds the skewed osculating circle or osculating ellipse 212 out to obtain the stretched osculating circle 214. In this manner, the curve enhancement system reduces the curvature of the curve near the first end point P0 by scaling and stretching the osculating circle 208 (FIG. 2C) to obtain the stretched osculating circle 214.

While not illustrated, in some embodiments, the curve enhancement system determines generates an osculating circle for each end point of a curve. In the case of employing an osculating circle for both end points, the curve enhancement system can stretch the second stretched osculating circle as described above with respect to osculating circle 208 and skewed osculating circle (e.g., osculating ellipse 212). Further, in the case of employing two osculating circles, each osculating circle is scaled and stretch according to the scaling factor corresponding to the end point to which the osculating circle belongs. As such, if the scaling factor s is larger near $Y_{S0}$ than near $Y_{S1}$, the scaling of the first osculating circle corresponding to $Y_{S0}$ will be larger than the scaling of the second osculating circle corresponding to $Y_{S1}$.

In one or more embodiments, the curve enhancement system uses the stretched osculation circles to obtain the angle and curvature of each curve, and in some cases, without knowledge of the actual curve. The curve enhancement system then can use these "altered" angles (e.g., the altered tangent angle lines 206c and 206d) and curvatures of the stretched circles as inputs in determining the CVC curve parameters. Then, when a curve is downscaled (described below), the curve will have the correct input angles and curvatures.

As mentioned above, FIG. 2F illustrates CVC curves 210 created based on the scaled curve 202. By computing one or more CVC curves from the scaled curve 202, the curve enhancement system identifies the desired angles and curvatures at a series of points along the CVC curves (with or without using the stretched osculating circles), including at the end points of the curve. In particular, the end points include end point constraints (e.g., a starting direction, an ending direction, a starting curvature, and an ending curvature) that enable the curve enhancement system to capture the curvature and direction of the CVC curves.

With the end point constraints being maintained (i.e., applying the end point constraints), the curve enhancement system downscales or downscales the scaled curve 202. Maintaining the end point constraints enables the curve enhancement system to downscale the scaled curve 202 while preserving the enhanced curvature. The curve enhancement system downscales the scaled curve 202 using an inverted scaling factor that is inversely proportionate to the scaling factor $Y_{S0}$ and $Y_{S1}$ (e.g., the inverse of the enhanced y-scale factors, or $1/Y_{S0}$ and $1/Y_{S1}$). FIG. 2G illustrates the scaling factor $s^{-1}$ used in the present example for the curve 200. The inverted scaling factor $s^{-1}$ appears symmetrical about y=1 to the scaling factor s shown in FIG. 2D. Note, in FIG. 2G, the reciprocal curve goes between 0.5 and 1.0 on the y-axis.

In some embodiments, when downscaling the scaled curve 202, the curve enhancement system applies an inverted scaling factor $s^{-1}$ to the stretched osculating circles for the enhanced curve at (0,0) and (1,0) respectively. Thus, in downscaling the stretched osculating circles, the curve enhancement system preserves the enhanced angle and curvature of the enhanced curves because downscaling the radius of the stretched osculating circles by the corresponding inverted scaling factor $s^{-1}$ does not change (or minimally changes) the angle or curvature of the stretched osculating circles. As such, the curve enhancement system uses the downscaled stretched osculating circles to maintain the end points constraints found using the CVC curves. For example, the curve enhancement system uses the downscaled stretched osculating circles and inverted scaling factor to likewise downscale the non-uniformly scaled curve into an enhanced curve based on downscaling the stretched osculating circles. As a note and as described above, using this method, the curve enhancement system may not achieve actual G2 continuity, but the curve enhancement system can achieve approximate G2 continuity, where the difference between actual G2 continuity and approximate G2 continuity is undetectable to the human eye.

To illustrate, FIG. 2H illustrates an enhanced curve 204, which is the downscaled version of the scaled curve 202. The enhanced curve 204 adheres to the downscaled osculating circle 218, which have been downscaled by the inverted scaling factor $s^{-1}$ ($1/Y_{S0}$ and $1/Y_{S1}$ respectively), and which have the same angles and curvature of the stretched osculating circle 214. Because the stretched osculating circle 214, and hence the downscaled osculating circle 218, has reduced the curvature in the curve 200, the enhanced curve 204 will have a fuller, rounder curve that appears more fair and aesthetically pleasing to a user. Alternatively, in some embodiments, FIG. 2H may represent one or more CVC curves that has been downscaled and enhanced. In these embodiments, the curve enhancement system fits one or more Bézier curves to the downscaled CVC curves, as described below.

FIG. 2I illustrates the curve enhancement system rotating the enhanced curve 204 back to its original orientation. For example, the curve enhancement system re-locates the enhanced curve 204 by moving the enhanced curve 204 by +P0 (from FIG. 2A) within the canonical coordinate system. Further, in FIG. 2I the curve enhancement system relocates the enhanced curve 204 in the original coordinate system. When comparing the input curve 200 to the enhanced curve 204, one can see that the enhanced curve 204 is more fair. To many people, the added roundness makes the enhanced curve 204 more aesthetically pleasing.

In one or more embodiments, the enhanced curve 204 in FIG. 2I may be a Bézier curve. For example, the curve enhancement system may fit one or more Bézier curves to the downscaled curve 202 before converting the enhanced curve 204 back to the original coordinate system. Alternatively, the curve enhancement system may fit one or more Bézier curves to the stretched curve 202 (or the CVC curves 210 directly) and apply the inverse scaling (i.e., downscaling) and rotation to the one or more Bézier curves to generate the enhanced curve 204. Additional detail regarding fitting a single Bézier curve or multiple Bézier curves to a stretched curve 202, a downscaled curve 204, or a CVC curve 210 is provided below.

FIGS. 3A-3D illustrates an example of a spline with multiple curves where each curve is non-uniformly stretched in a separate canonical coordinate system in accordance with one or more embodiments. As mentioned above, the curve enhancement system can enhance multiple curves in a spline to create a richer and fuller spline. To illustrate, FIG. 3A illustrates spline 300, which includes a first curve 302, a second curve 304, and a third curve 306.

As described above, the curve enhancement system needs only two control points to enhance a curve. When multiple curves are in a spline, the curve enhancement system can use middle control points to enhance the curve of each curve. In general, if there are N curves in a spline, the curve enhancement system needs N+1 control points to enhance each curve in the spline.

As shown, each curve 304-306 has two control points. The first curve 302 starts at control point P0 and ends at control point P1. The second curve 304 starts at control point P1 and ends at control point P2. The third curve 306 starts at control point P2 and ends at control point P3. Note that each curve 304-306 in the spline 300 shares at least one control point with another curve.

The curve enhancement system, as described above, separately enhances each curve 304-306 in the spline 300. To illustrate, the curve enhancement system translates and rotates the first curve 302 into a first customized canonical coordinate system 310 shown in FIG. 3B. The curve enhancement system translates and rotates the second curve 304 into a second customized canonical coordinate system 320 shown in FIG. 3C. Likewise, the curve enhancement system translates and rotates the third curve 306 into a third customized canonical coordinate system 330 shown in FIG. 3D.

Because each curve is in a customized canonical coordinate system, the curve enhancement system can non-uniformly scale each curve 304-306 with respect to the custom canonical coordinate system to which the curve corresponds, as descried above. Further, using the customized canonical coordinate system, the curve enhancement system can independently enhance each curve using the systems and methods described above, and further detailed below. After each curve is enhanced, the curve enhancement system can generate an enhanced spline, or a spline having enhanced curves.

Now that an overview of the processes of enhancing an input spline has been provided with reference to FIGS. 2A-2I and FIGS. 3A-3D, additional details of the process are provided here below.

As mentioned above, the curve enhancement system computes CVC curves within the canonical coordinate system. Before describing how the curve enhancement system computes CVC curves, a high-level description of computing CVC parameters is provided. In particular, a top-level algorithm that the curve enhancement system can employ in some embodiments is described. One will note that the output of the algorithm is a series of CVC curves. Further, in the algorithm, each CVC curve is represented by a structure with ten fields giving the parameters required to construct points on the CVC curve. These parameters are summarized in Table 1 below. In some embodiments, the fields in Table 1 are represented as floating point numbers. In other embodiments, the fields in Table 1 may be another type of data.

TABLE 1

| Parameter Names | Meaning |
| --- | --- |
| a, b, c, d | Coefficients of curvature polynomial $k(s) = a \times s^3 + b \times s^2 + c \times s + d$ |
| $Y_{S0}, Y_{S1}$ | Non-uniform scaling for the start point and end point of a curve |
| tx, ty | Required translation of curve |
| R and S | Required rotation and scale of curve |

The curve enhancement system takes as input a series of N control points, P(1), P(2), . . . P(N) and generates as output a series of N−1 CVC curves, denoted C(1), C(2), . . . C(N−1). In particular, the computes variables A and K. The variables A and K represent arrays that hold the required angle and curvature at each of the N control points. The curve enhancement system computes A and K based on the control points (p) using a quadratic kCurve Algorithm, which computes quadratic kappa curves. For example, the curve enhancement system implements the quadratic kCurve Algorithm as described in U.S. Patent Publication No. 2015/0062129, which is hereby incorporated by reference in its entirety. After using a quadratic kCurve Algorithm to calculate A and K, the curve enhancement system computes each of the CVC curves between adjacent control points using a CVC algorithm. The curve enhancement system utilizes the CVC algorithm with respect to the canonical coordinate system, as described above. One embodiment of a CVC algorithm takes as inputs (P0, P1, A0, A1, K0, K1) and provides an output (C). As described above, the input P0 and P1 are the control points that start (e.g., the first end point P0) and end (e.g., the second end point P1) the curve, the inputs A0 and A1 are the angles of the tangents at the start and end of the curve, and the inputs K0 and K1 are the curvatures at the start and end of the curve.

The curve enhancement system computes the distance between the start point and the end point using the following distance algorithm: $B=\text{sqrt}((P1.x-P0.x)^2+(P1.y-P0.y)^2)$. In general, the notation "p.x" refers to the x-coordinate of the point referred to by variable p. Likewise, "p.y" is the y-coordinate of the point referred to by variable p. In addition, the notation "A.b" refers to A being a structure and b being a field name of that structure. Further, "A.b" itself is the value of the field.

The curve enhancement system computes $K_{max}$, which is the maximum allowed curvature at the end points for the curve at hand, as $K_{max}=H/B$. The curve enhancement system defines a constant, H, which is used to determine when the curve will need to be non-uniformly scaled and by how much. The constant H has a physical interpretation, which is the maximum allowed curvature at either end of a CVC curve when the distance between the curve endpoints is 1. For example, in one or more embodiments, the curve enhancement system defines H as 4. In alternative embodiments, the curve enhancement system uses other constant values.

The curve enhancement system computes the reciprocals of the non-uniform scale factors $(1/Y_{S0})$ and $(1/Y_{S1})$ that are applied to the beginning and end of the curve respectively. The curve enhancement system then stores the reciprocals of the non-uniform scale factors into the structure, C. In many cases, working with the reciprocals of the scale factors is less computationally intensive than working directly with the scale factors themselves.

To calculate the non-uniform scale factors $(1/Y_{S0})$ and $(1/Y_{S1})$, the uses the following formulas: $1/Y_{S0}=\text{SyForKRatio}(K0/K_{max}, A0)$ and $1/Y_{S1}=\text{SyForKRatio}(K1/K_{max}, A1)$. Where the function Sy is 1 if $\text{abs}(a)<1e-10$. Otherwise, $\text{SySq}=-\cot(a)^2+\text{SySq}=\cot(a)^2+(2\times\cos(\pi/6+(\frac{1}{3})\times a \sin((3/2)\times\text{sqrt}(3)\times\text{Cr}\times\cos(a)^2\times\sin(a))))/(\sin(a)^3\times\text{sqrt}(3)\times\text{Cr})$ and $\text{Sy}=\text{sqrt}(\text{SySq})$. The input Cr is the ratio of the required curvature to the maximum allowed curvature. The input a is the tangent angle at the end point. As shown, the curve enhancement system checks for a very small angle because the main computation is numerically unstable in that case. The curve enhancement system computes the square of the altered curvature. The computation involves solving a cubic equation and taking the middle root. This cubic equation is solved directly via the trigonometric method. As a note, this function returns the reciprocal of the scale factor that is be used to compute the curve from the CVC curve.

Next, the curve enhancement system computes the altered angles and curvatures. In computing the altered angles and curvatures, it is assumed that the canonical coordinate system has been stretched by a blend between $C.Y_{S0}$ ($C.Y_{S0}=1/\text{InvY}_{S0}$) and $C.Y_{S1}$ ($C.Y_{S1}=1/\text{InvY}_{S1}$) from the begin point to the end point. The first altered angle is calculated as $\text{A0Altered}=\text{atan2}(\text{InvYS0}\times\sin(A0), \cos(A0))$. The second altered angle is calculated as $\text{A1Altered}=\text{atan2}(\text{InvYS1}\times\sin(A1), \cos(A1))$.

The altered curvatures (K0Altered and K1Altered) are generally smaller than $K_{max}$. In particular, the curve enhancement system computes the altered angles and curvatures as follows: $\text{kSc}=(\text{sqrt}(8)\times k.\times\text{Sy})/((1+\text{SySq}-(\text{SySq}-1)\times\cos(2\times\text{ang}))^{3/2})$. The inputs k and ang are the required curvature and angle in the original coordinate system, and the input Sy is the reciprocal scale factor where $\text{SySq}=\text{Sy}.\times\text{Sy}$. The foregoing function returns the curvature of the osculating circle at (0,0) that has been scaled in the y direction by Sy. The osculating circle is the unique circle through (0,0) with radius $1/k$ and that goes through (0,0) and angle ang.

Next curve enhancement system computes the coefficients of $k(s)=a\times s^3+b\times s^2+c\times s+d$, which is the polynomial that determines the curvature, and hence, the shape of the CVC curve in the canonical coordinate system using A0Altered, A1Altered, $B\times\text{K0Altered}$, $B\times\text{K1Altered}$ as inputs. As a note, the canonical coordinate system is B times smaller than the original coordinate system so the curvatures can be scaled up accordingly, where 1/B is the length of a curve from the start point to the end point.

The curve enhancement system computes the reciprocals of $1/Y_{S0}$ and $1/Y_{S1}$, storing them into the CVC structure to be returned. The curve enhancement system then computes the required translation, rotation, and scale from the canonical coordinate system to the original coordinate system as $C.tx=P0.x$, $C.ty=P0.y$, $C.R=\text{atan2}(P1.y-P0.y, P1.x-P0.x)$, and $C.S=B$.

Additional detail regarding stretching and downscaling by the curve enhancement system will be described. Variable y-scaling used to scale CVC curves may, in some cases, be a prerequisite to generating points on a CVC curve. As described above, the amount of y-scaling by the curve enhancement system may depend on the x-coordinate in the canonical coordinate system. For example, the amount of scaling at intermediate points will be controlled by a blending function, b(x), that given an x-coordinate tells how much of YS0 and how much of YS1 to use at the point (x,y). As mentioned previously, a blending function uses the given x-coordinate and calculates the mix of $Y_{S0}$ and $Y_{S1}$ to use at the point (x,y).

The blending function using $a=x/B$ and $b=3\times a^2-2\times a^3$. The first input argument x is the x-coordinate of a point and the second argument B is the baseline length. As shown, a is 0 when x=0 and a is 1 when x=B. In many embodiments, the curve enhancement system does not use a simple linear blending function. One reason for this is that the blending function should to have a derivative of 0 with respect to x when x=0 or when x=B. This property allows curvatures to change in a predictable way when using variable y-scaling. Alternatively, in some embodiments, the curve enhancement system uses a simple linear blending function with the added requirements that the curve enhancement system returns 0 when x=0 and 1 when x=B.

In one or more embodiments, to achieve a greater precision, the curve enhancement system can apply a variable y-scaling with the blending function that changes the curvatures at the end points in the same way that a uniform scale of $Y_{S0}$ would change the curvature at the start point and a uniform scale of $Y_{S1}$ would change the curvature of the end point. This point is not trivial when using a fixed y scale on the osculating circles to compute the altered angles and curvatures in the CVC curves described above. (Note that the above blending function is the simplest polynomial that is 0 at x=0 and 1 at x=1, and has zero derivative at x=0 and x=1.)

For example, the curve enhancement system calculates the variable y scale as a function of x, y, B, $Y_{S0}$, $Y_{S1}$. In particular, $S=(1-b)/YS0+b/Y_{S1}$. Also as part of the more complex blending function $yS=S\times y$ and $xS=x$, as mentioned above. As shown, the input x is the x-coordinate of a point, the input B is the baseline length, the input y is the y-coordinate of the point, and the inputs $Y_{S0}$ and $Y_{S1}$ are the left and right y-scale factors. The more complex blending function returns the new value of the y-coordinate of the point. This function is a forward y-scale intended to reduce the y-coordinates to be closer to the baseline and increase the curvatures at the end points. Note that this function uses the blending factor b, to interpolate the reciprocals of $Y_{S0}$ and $Y_{S1}$ to compute yS, which is then used as a reciprocal scale factor. To reverse or apply inverse variable y-scaling (e.g., downscale), the curve enhancement system can the following functions: $S=(1-b)/YS0+b/Y_{S1}$; $yS=y/S$; and $xS=x$.

With an understanding of stretching and downscaling by the curve enhancement system, embodiments of the curve enhancement system that include generating control points on a CVC curve will now be described. These embodiments assume that the curve enhancement system is operating within the canonical coordinate system and uses the array of structures describing consecutive CVC curves for the desired curve.

The goal of the curve enhancement system is to produce the illusion of a smooth curve by plotting lines between a series of closely spaced points along this curve. A useful input parameter to this process, then, is the desired spacing between consecutive such points. One can appreciate that given a description for producing such a set of points for one CVC curve, additional sets of points for additional CVC curves in a spline can be likewise produced. As such, for simplicity, only a method for converting one CVC into a series of point in the original coordinate system with a specified spacing between the points is described.

The method of generating control points on a CVC curve described below assumes an understanding of generating a sequence of points for a CVC curve in the canonical coordinate system. In this manner, the curve enhancement system need only perform a function that (a) estimates the spacing of points in the canonical coordinate system from the desired spacing in the original coordinate system, (b) applies the variable y-scaling to get the scaled curve from the CVC curve, and (c) translates points generated to the original coordinate system.

The CVC curve function takes as inputs C and the required point spacing. The curve enhancement system computes the required point spacing in the canonical coordinate system as cSpc=spacing×C.S. The curve enhancement system computes the CVC points, prior to downscaling, in the canonical coordinate system as [cx, cy, n]=PointsOnCVC (C.a, C.b, C.c, C.d, cSpc). The curve enhancement system pre-compute values used for the rotation and scale from the canonical coordinate system to the original coordinate system as scC=C.S×cos(C.R) and scS=C.S×sin(C.R). The curve enhancement system allocates the arrays to hold the list of points to be returned as x=allocate(n) and y=allocate(n). The curve enhancement system then carries out the variable y-scaling (scaling) as per the function described above where [xs, ys]=VariableYScale (cx(i), cy(i), C.B, C.B.YS0, C.B.YS1). The curve enhancement system carries out the conversion from the canonical coordinate system to the original point coordinate system as $x(i)=C.tx+scC×xs-scS×ys$ and $y(i)=C.ty+scS×xs+scC×ys$.

Next the curve enhancement system can fit a single Bézier curve or multiple Bézier curves to one or more CVC curves. For brevity sake, the following describes fitting Bézier curves to the points from one CVC curve; fitting Bézier curves to additional CVC curves can be extrapolated therefrom. Further, it should be noted that regardless of where the points come from, embodiments of the curve enhancement system described herein can use any available method to perform curve fitting.

In one or more embodiments, to perform cubic Bézier curve fitting, the curve enhancement system uses a function that takes as input an array of x and y coordinates corresponding to a sequence of points and tangent angles for the first and last point that produces as output the eight coefficients of a cubic Bézier curve. The eight coefficients of a cubic Bézier curve should match the first and last points as closely as possible, along with an error term that gives the maximum distance from any input point to the computed cubic Bézier curve.

In one or more embodiments, the calling form of this function is [P1, P2, maxError]=FitCubicBezier(x, y, n, a0, a1), where the inputs x and y are give the coordinates of n points to be fitted, and the inputs a0 and a1 give the required tangent angles at the first and last point respectively. As described above, cubic Bézier curve has four control points each having an x and y coordinate, which are usually denoted P0, P1, P2, and P3. The first control point P0 generally matches the first point in the x, y coordinate list (i.e., P0=(x(1), y(1)), and is generally not returned. Likewise the last control point P3 should equal the position of the last point in the list (i.e., p3=(x(n),y(n))) and also not returned. As such, the fitting routine only need return the middle two control points, P1 and P2.

As mentioned above, in some embodiments, the curve enhancement system can one fit a single cubic Bézier curve to the points from each scaled CVC curve. In these embodiments, the curve enhancement system calls the above curve fit function for the points garnered from each individual scaled CVC curve.

The curve enhancement system obtains the required angles and curvatures from the quadratic curve system, such as the Quadratic Kappa Curves (or "QKC") mentioned above. The curve enhancement system generates the CVC parameters as described above. The curve enhancement system allocates an array, Z, to hold the control points for the cubic Bézier curve as Z=allocatePoints(3 x(N-1)+1). The curve enhancement system sets the first Bézier control point to the first user control point P as Z(1)=P(1).

Then the curve enhancement system computes successive Bézier control points for each CVC curve. In particular, the curve enhancement system converts the CVC curve to a set of finely sampled points. The curve enhancement system fits a single cubic Bézier curve to those points. Note that the communication session can enforce G1 continuity between Bézier curves by using the same angle at the end of one curve and the beginning of the following curve. The curve enhancement system transfers the interior control points, P1 and P2, to the array Z as Z((i-1)×3+2)=P1 and Z((i-1)×3+3)=P2. The curve enhancement system copies the user control point between curves to the array Z as Z((i-1)×3+4)=P(i+1).

As mentioned above, in some embodiments, the curve enhancement system can one fit a single cubic Bézier curve to the points from each scaled CVC curve before nonuniformly scaling and/or downscaling. In the above-described embodiments, the curve enhancement system applies the non-uniform variable y-scaling to the points on the CVC curve before fitting the Bézier curve. In the presently described embodiments, the order of operations is switched. Namely, the curve enhancement system fits the Bézier curve to the points on an un-scaled CVC curve before applying the non-uniform variable y-scaling.

In practice, this method yields some advantages over the embodiments described above. For example, as one advantage, Bézier curve fitting generally works better on normal CVC curves. For instance, Bézier curve fitting is an iterative process that converges faster and more accurately for the normal CVC curves. As another example, in some cases, the curve enhancement system may achieve a somewhat better visual appearance if a Bézier curve is optimize the fit to the normal CVC curve before non-uniformly scaling and downscaling.

One drawback, however, is that if the points are scaled and downscaled after the Bézier curve fitting, the points may no longer form a Bézier curve. When this occurs, the curve enhancement system needs to apply another round of Bézier curve fitting. This addition round would likely nullify the first advantage mentioned above.

As one workaround to this drawback, the curve enhancement system can apply the non-uniformly scaling and downscaling operation to the Bézier curve to fit the CVC curve by simply modifying the control points of the Bézier curve. In some cases, this gives the same result as if the x-coordinates of the middle control points (e.g., P1 and P2 (not end control points P0 and P3)) are at ⅓ and ⅔ in the canonical coordinate system.

In other cases, the curve will not be the same, but the visual appearance will still retain the desired properties of appearing round and fair because the starting and ending tangents will be correct, the curvatures will be approximately correct, and the final Bézier curve will still generally follow the shape of the enhanced CVC curve. This is implemented by the curve enhancement system obtaining the points on the normal CVC curve (note the points are in the canonical coordinate system). The curve enhancement system fits a cubic Bézier to these points, and since the input points are in the canonical coordinate system, the two control points that are returned, Q1 and Q2, will also be in the canonical coordinate system.

The curve enhancement system applies the y-scaling factors that are typically apply the non-uniform variable y-scaling, to the control points themselves. Where $Q1.y=Q1.Y \times C.Y^{S0}$ and $Q2.y=Q2.y \times C.Y^{S1}$. After this adjustment to the y-coordinates of the Bézier control points, their tangent angles will have the same values as required by the enhanced curve, and the end point curvature will be approximately correct.

The curve enhancement system converts the control points Q1 and Q2 that are in canonical coordinates to control points P1 and P2 in original coordinates as $P1.x=C.tx+C.S \times \cos(C.R) \times Q1.x - C.S \times \sin(C.R) \times Q1.y$; $P1.y=C.ty+C.S \times \sin(C.R) \times Q1.x + C.S \times \cos(C.R) \times Q1.y$; $.x=C.tx+C.S \times \cos(C.R) \times Q2.x - C.S \times \sin(C.R) \times Q2.y$; and $P2.y=C.ty+C.S \times \sin(C.R) \times Q2.x + C.S \times \cos(C.R) \times Q2$.

As mentioned above, in some embodiments, the curve enhancement system can one fit multiple cubic Bézier curve to a single CVC curves. In particular, embodiments that involve fitting multiple cubic Bézier curves to the points from a single CVC curve are discussed above. In these embodiments, the curve enhancement system can specify a maximum allowable error between the Bézier curves and the original points. In this case, the curve enhancement system obtains a minimum number of Bézier curves and/or points from each CVC curve so that the maximum error from each curve to its points is less than the error tolerance.

It will be appreciated that the foregoing can be easily modified to achieve this objective. For example, the curve enhancement system can try to fit the points. If the returned error is too large, then the curve enhancement system can divide the set of points roughly in half and again attempt to fit a Bézier curve to each half. If the attempt to fit the curve again fails to produce the required error, the curve enhancement system can divide the offending set of points in half again. The curve enhancement system can recursively repeat this procedure until the resulting sets of points are small enough to be accurately fit the required error. Note, that if the number of points is 4 or less, a single Bézier curve can be fit exactly to the points.

In one or more embodiments, the curve fitting function requires an angle to be supplied at each end point. If, the curve enhancement system is attempting to fit a sequence of points with indices, for example, from J to K. If J is not 1, then the curve enhancement system supplies an angle for the first point. If K is not n, then the curve enhancement system supplies an angle for the last point. These angles, however, can be deduced from the curvature polynomial $k(s)=a \times s^3 + b \times s^2 + c \times s + d$. (Recall from above that the coefficients to this polynomial are stored in the struct C(i).) As such, the curve enhancement system can obtain the difference in angle of a curve between points by integrating the curvature per arc length. Thus, the curve enhancement system can compute the difference in angle from the reference point to any other point using $a \times s^4/4 + b \times s^3/3 + c \times s^2/2 + d \times s$, where s is the arc length to the reference point. In addition, if the reference point is used in the middle of the curve, the curve enhancement system can compute s from the index J (or K) as $(J-N/2) \times spacing/s$. Further, the angles obtained by the curve enhancement system (in radians) are then applied to the over all curve rotation to get an angle in the original coordinate system. One will appreciate that other techniques can also be adapted to fit Bézier curves to the CVC curves generated by the curve enhancement system.

Figure 4:
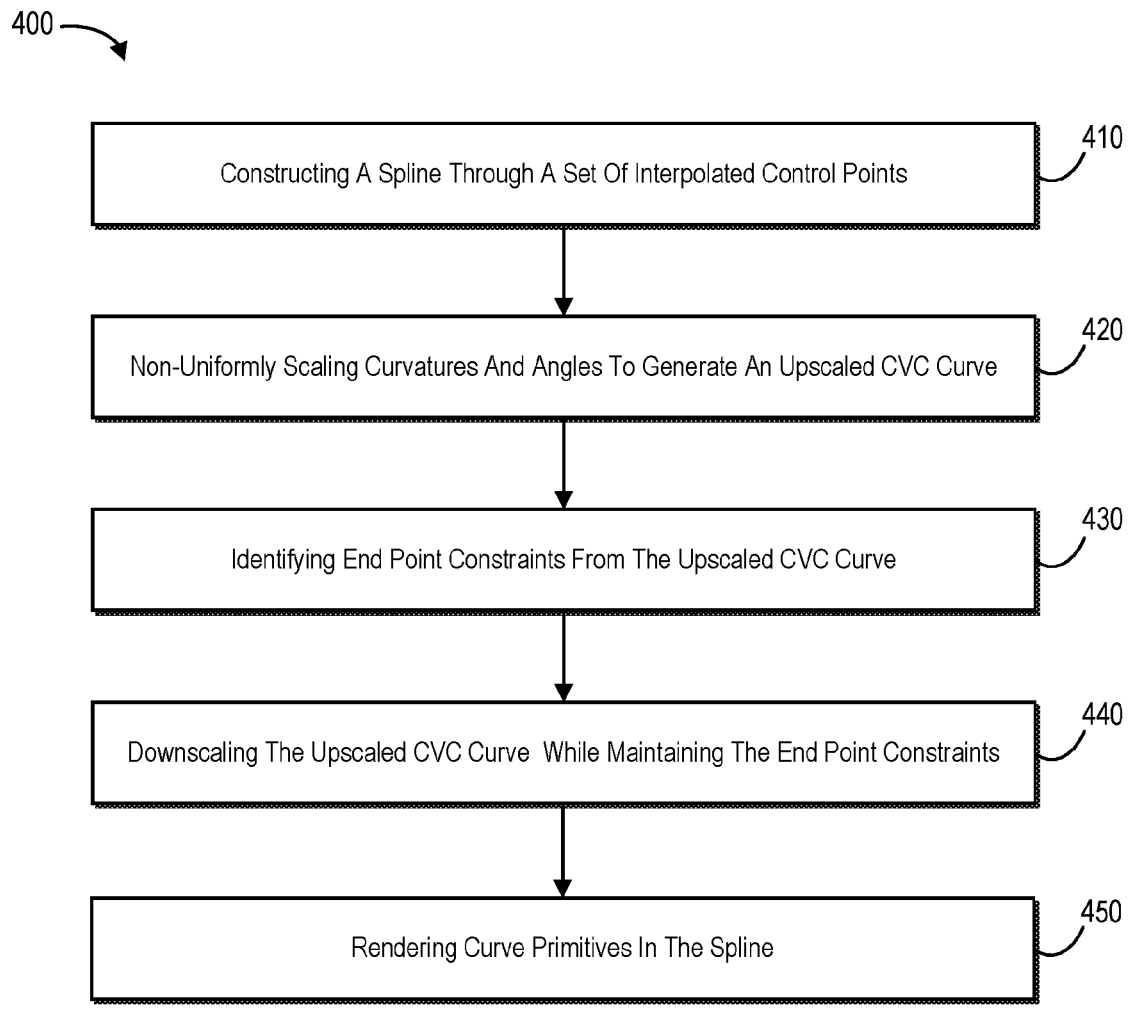
FIG. 4 illustrates a flowchart of a series of acts in another method of enhancing curves in accordance with one or more embodiments.
Figure 5:
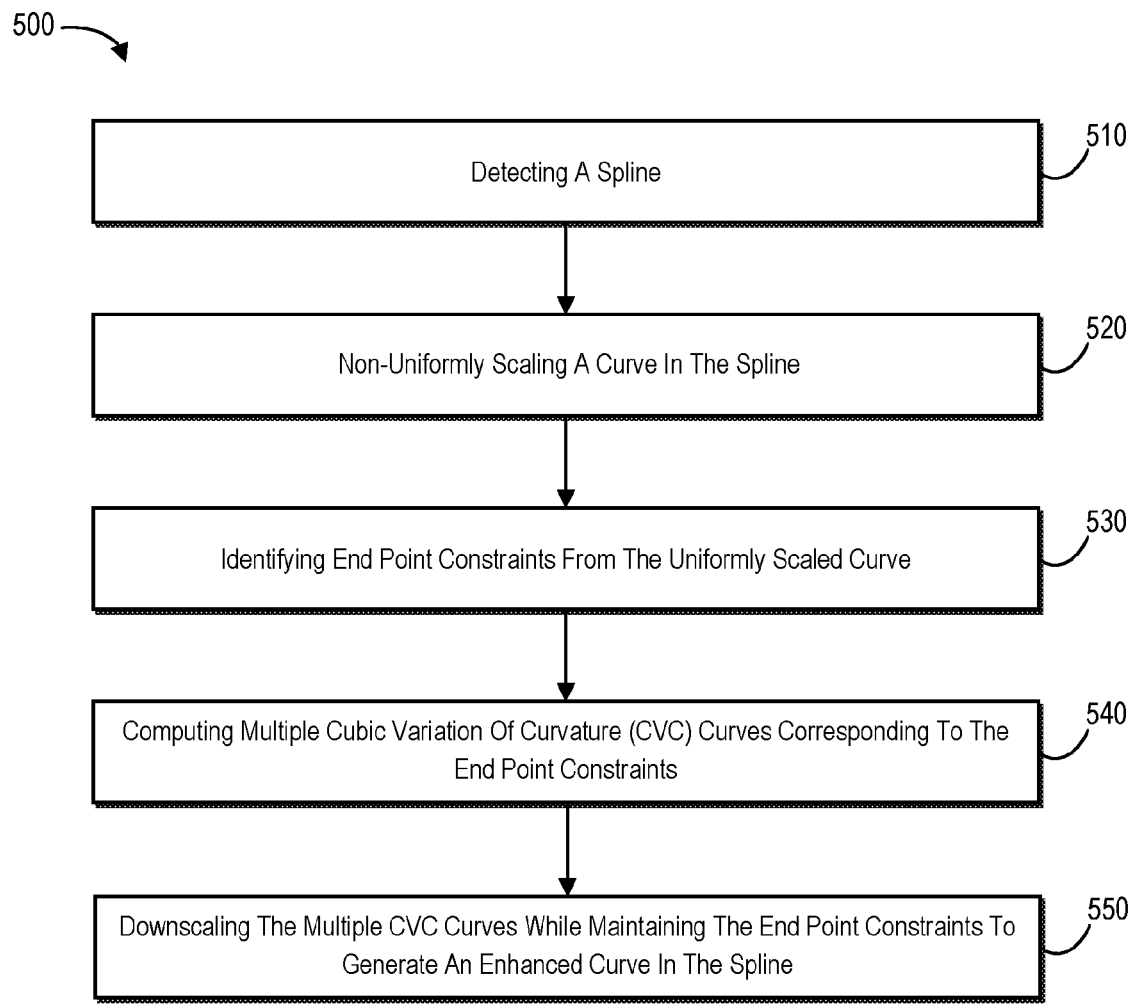
FIG. 5 illustrates a flowchart of a series of acts in a method of enhancing curves in accordance with one or more embodiments.

FIGS. 1A-3D, the corresponding text, and the examples, provide a number of different systems and devices for generating enhanced curves and lines in accordance with one or more embodiments. In addition to the foregoing, one or more embodiments can also be described in terms of flowcharts comprising acts and steps in a method for accomplishing a particular result. For example, FIGS. 4 and 5 illustrate flowcharts of exemplary methods in accordance with one or more embodiments. The methods described in relation to FIGS. 3 and 4 may be performed with less or more steps/acts or the steps/acts may be performed in differing orders. Additionally, the steps/acts described herein may be repeated or performed in parallel with one another or in parallel with different instances of the same or similar steps/acts.

FIG. 4 illustrates a flowchart of a series of acts in another method 400 of enhancing curves in accordance with one or more embodiments disclosed herein. In one or more embodiments, the method 400 is implemented in a digital medium environment for receiving input from a user and rendering spline-based designs based on the user input. Further, a computing device, such as client device 400 or computing device 600 can implement a curve enhancement system that implements the method 400.

The method 400 includes an act 410 of constructing a spline through a set of interpolated control points. A tangent angle and a curvature can be specified at each interpolated control point. In one or more embodiments, act 410 involves calculating the tangent angle and the curvature for each interpolated control point using a quadratic kCurve algorithm. In particular, the act 410 may involve using cubic variation of curvature (CVC) curve primitives to construct a CVC curve between each adjacent pair of points using the given curvature and angle.

As shown in FIG. 4, the further includes an act 420 of non-uniformly scaling curvatures and angles to generate an upscaled CVC curve. In particular, the act 420 can involve non-uniformly scaling the curvature and angle for each interpolated control point by a non-uniform scaling factor to generate an upscaled CVC curve 202. For example, the act 420 can involve non-uniformly scaling in a single direction by a scaling factor. For example, the act 420 can include scaling using variable y-scaling. Further, in various embodiments, the scaling factor is based on a non-linear blending function as a function of the two end points, where the non-linear blending function is based on a location of the curve along the horizontal axis of a canonical coordinate system and a baseline length.

The method 400 also includes an act 430 of identifying end point constraints from the upscaled CVC curve. In some embodiments, the end point constraints from the upscaled CVC curve include a starting direction, an ending direction, a starting curvature, and an ending curvature. In one or more embodiments, the end point constraints can correspond to an angle and curvature of a corresponding osculating circle. Further, in additional embodiments, the end point constraints from the multiple CVC curves are curvature continuous such that tangent angles and curvatures of curve primitives beginning at end points of the multiple CVC cures match at a joining point between the multiple CVC curves.

Additionally, the method 400 includes an act 440 of downscaling the upscaled CVC curve while maintaining the end point constraints. In particular, the act 460 may involve downscaling the upscaled CVC curve using a downscaling factor inversely proportional to the non-uniform scaling factor while maintaining the end point constraints. In some additional embodiments, the act 440 of downscaling includes scaling the upscaled CVC curve by an inverse variable y-scaling factor.

The method 400 also includes an act 450 of rendering curve primitives in the spline. For example, the act 450 may include rendering the downscaled Bézier curve primitives as an enhanced curve 204. In addition, the method 400 may include fitting a Bézier curve to the downscaled CVC curve and rendering the fit Bézier curve. Alternatively, act 450 can involve fitting a Bézier curve to the upscaled CVC curve prior to downscaling the upscaled CVC curve.

As another example, the method 400 may include another act of transforming the curve to a canonical coordinate system by translating, rotating, and scaling the curve. In some embodiments, the method 400 may include an act of identifying an arc length of the curve, calculating a radius of a tangential osculating circle adjacent to an end point of the end points of the curve, determining that a radius of the tangential osculating circle is less than one-sixth of an arc length of the curve, and based on the determination, non-uniformly scaling FIG. 5 illustrates a flowchart of a series of acts in a method 500 of enhancing curves in accordance with one or more embodiments disclosed herein. In one or more embodiments, the method 500 is implemented in a digital medium environment for receiving input from a user and rendering curve-based designs based on the user input. Further, a computing device, such as client device 400 or computing device 600 can implement a curve enhancement system that implements the method 500.

The method 500 includes an act 510 of detecting a spline. In particular, the act 510 may involve detecting user input defining at least a portion of a spline having one or more curve primitives. For example, the act 510 of detecting user input may involve detecting a stroke on a touch-sensitive device, such as stylus pad or touch-screen. In one or more embodiments, the act 510 of detecting user input may involve detecting a user providing input from a first end point to a second end point.

The method 500 further includes an act 520 of non-uniformly scaling a curve in the spline. In particular, the act 520 can involve non-uniformly scaling a curve primitive in a single direction. In some embodiments, the act 520 involves non-uniformly scaling the curve in the single direction based on a vertical value of the curve along the horizontal axis. For example, the act 520 can include scaling the curve non-uniformly using variable y-scaling. Further, in various embodiments, the non-uniformly scaling can occur in a canonical coordinate system.

The method 500 also includes an act 530 of identifying end point constraints. In particular, the act 530 may include identifying end point constraints from the non-uniformly scaled curve 202. In various embodiments, the act 530 may also involve employing oscillating circles associated with each end point to identify the end point constraints.

In addition, the method 500 includes an act 540 of computing multiple cubic variation of curvature curves. In particular, the act 540 may involve computing multiple cubic variation of curvature (CVC) curves 210 corresponding to the end point constraints. In one or more embodiments, the method may also include an act of determining an arc length for the curve 200 with respect to a reference point, and computing the multiple CVC curves 210 can include computing the multiple CVC curves based on the arc length for the curve.

The method 500 further includes an act 550 of downscaling the multiple CVC curves to generate an enhanced curve in the spline. In particular, the act 550 may involve downscaling the multiple CVC curves while maintaining the end point constraints to generate an enhanced curve 204. In some additional embodiments, the act 550 of downscaling the non-uniformly scaled curve 202 involves downscaling the non-uniformly scaled curve 202 inversely proportionate to scaling the non-uniformly curve 202.

The method 500 may also include additional acts. For example, the method 500 may include an act translating the curve. In some embodiments, translating the curve includes locating a starting point of the curve at the origin of a canonical coordinate system, rotating the curve with the canonical coordinate system such that the curve is horizontal with a horizontal axis of the canonical coordinate system, and scaling the curve within the canonical coordinate system such that an ending point of the curve is at a first unit along the horizontal axis of the canonical coordinate system.

As another example, the method 500 may include another act of fitting a single Bézier curve to the enhanced curve. In some cases, the single Bézier curve is fit to the enhanced without requiring the curvature of the Bézier curve to exactly match the end points of the enhanced curve. Further, this additional act may involve fitting a single Bézier curve to the multiple CVC curves. In some instances, the curve forms has a set of interpolated control points, where a tangent and a curvature are specified for each point in the set of interpolated control points, and where computing the multiple CVC curves includes using curve primitives of the curve to construct each of the multiple CVC curves between the set of interpolated control points.

Figure 6:
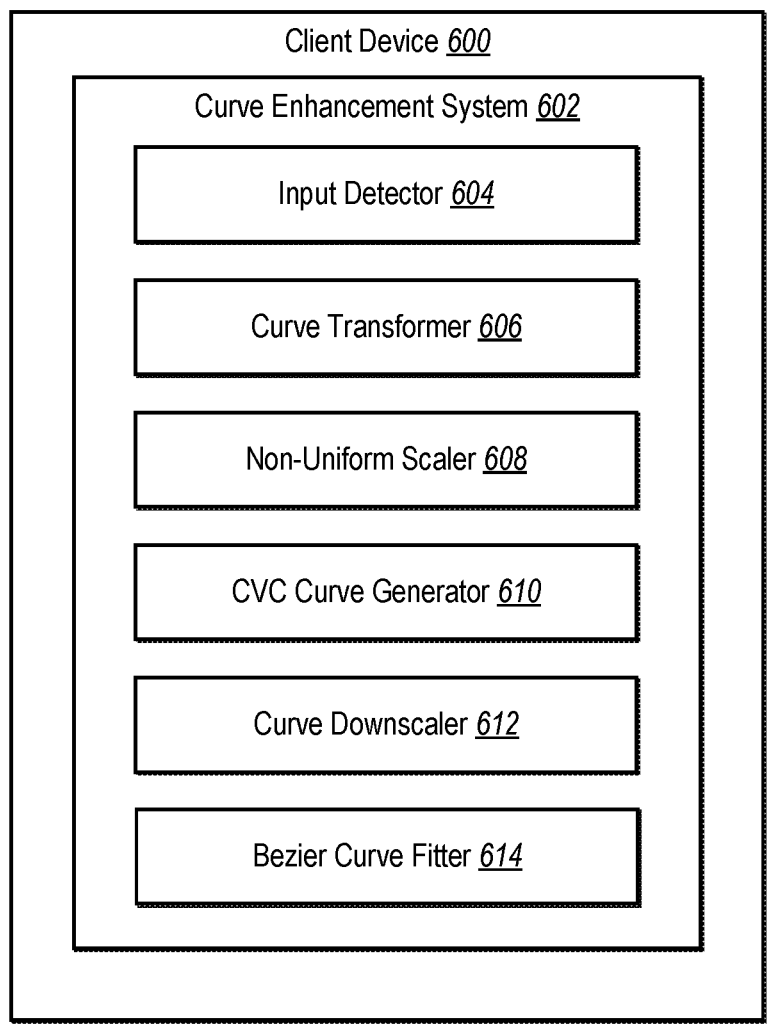
FIG. 6 illustrates an example schematic diagram of an example architecture of a curve enhancement system in accordance with one or more embodiments.

FIG. 6 illustrates an example schematic architecture diagram of a curve enhancement system 602 in accordance with one or more embodiments. As shown, a computing device 600 can implement the curve enhancement system 602. The computing device 600 can comprise a variety of computing devices. For example, the computing device 600 may be a mobile device (e.g., a mobile telephone, a smartphone, a PDA, a tablet, a laptop, a camera, a tracker, a watch, a wearable device, etc.). In some embodiments, the computing device 600 may be a non-mobile device (e.g., a desktop computer or another type of client device). Additional details with respect to the computing device 600 are discussed below with respect to FIG. 6.

As shown in FIG. 6, the curve enhancement system 602 can include various components for performing the processes and features described herein. For example, in the embodiment shown in FIG. 6, the curve enhancement system 602 includes an input detector 604, a curve transformer 606, a non-uniform scaler 608, a CVC curve generator 610, a curve downscaler 610, and a Bézier curve fitter 614.

The components 604-514 of the curve enhancement system 602 can comprise software, hardware, or both. For example, the components 604-514 can comprise one or more instructions stored on a computer-readable storage medium and executable by processors of one or more computing devices, such as a client device or server device. When executed by the one or more processors, the computer-executable instructions of the curve enhancement system 602 can cause the computing device(s) to perform the feature learning methods described herein. Alternatively, the components 604-514 can comprise hardware, such as a special purpose processing device to perform a certain function or group of functions. Alternatively, the components 604-514 of the curve enhancement system 602 can comprise a combination of computer-executable instructions and hardware.

As mentioned above, the curve enhancement system 602 includes an input detector 604. In one or more embodiments, the input detector 604 can detect, receive, and/or facilitate user input in any suitable manner. In some examples, the input detector 604 detects one or more user interactions with respect to the user interface. As referred to herein, a "user interaction" means a single interaction, or combination of interactions, received from a user by way of one or more input devices.

For example, the input detector 604 can detect a user interaction from a mouse, touch pad, touchscreen, stylus, and/or any other input device. In the event the client device 600 includes a touch screen, the input detector 604 can detect one or more touch gestures (e.g., swipe gestures, tap gestures, pinch gestures, or reverse pinch gestures) or strokes from a user that forms a user interaction. In some examples, a user provides the touch gestures in relation to and/or directed at one or more graphical objects or graphical elements of a user interface.

The curve enhancement system 602 performs one or more functions in response to the input detector 604 detecting user input and/or receiving other data. Generally, a user can create an enhanced curve by providing one or more user inputs that are provided to the curve enhancement system 602. For example, in response to the input detector 604 detecting user input, such as input defining a curve, one or more components of the curve enhancement system 602 render an enhanced curve.

The input detector 604 receives user input, such as a stroke. A stroke may define a curve that forms a spline. As used herein the term "stroke" refers to at least a portion of a spline having one or more curves. For example, a stroke can comprise an entire spline defined by a starting point at which the user engages an input device, an ending point at which the user disengages the input device, and a path between the starting point and the ending point. Alternatively, a stroke can comprise only a portion of a spline defined by a starting point at which the user engages an input device, an ending point at which the user disengages the input device, and a path between the starting point and the ending point.

The curve enhancement system 602 also includes a curve transformer 606. In general, the curve transformer 606 transforms an input curve or spline from an original coordinate system to a canonical coordinate system. As part of the transformation process, the curve transformer 606 positions and rotates the input curve within the canonical coordinate system. In addition, the curve transformer 606 fits the inputted curve within the canonical coordinate system. As described above, the curve transformer 606 can translate a curve into a customized canonical coordinate system for each input curve or portion of an input spline.

As mentioned previously, the curve transformer 606 positions and rotates the inputted curve within a canonical coordinate system as part of the transformation process. In particular, the curve moves the inputted curve into a canonical coordinate system and positions the starting point (e.g., the first end point) of the curve at the origin (i.e., (0,0)) of the canonical coordinate system. Further, the curve transformer 606 horizontally rotates the inputted curve so an end point of the curve lies on the x-axis of the canonical coordinate system.

In addition, the curve transformer 606 fits or scales the inputted curve within the canonical coordinate system. With the end point on the x-axis (or y-axis), the curve transformer 606 fits the last end point (e.g., the second end point) of the curve to the first coordinate of the x-axis (or y-axis), such as at x=1. In other words, the curve transformer 606 fits the curve to start at the origin (0,0) and finish at the first coordinate (1,0). The curve transformer 606 can resize the inputted curve to fit within the first coordinate of the canonical coordinate system or resize the canonical coordinate system to fit the inputted curve. Further, in fitting the inputted curve, the curve transformer 606 uniformly resizes the inputted curve, such that the inputted curve grows or shrinks equally in all directions.

As mentioned, the curve enhancement system 602 includes a non-uniform scaler 608. With the curve fitted and positioned within the canonical coordinate system, the non-uniform scaler 608 applies a scaling factor to the curve. The non-uniform scaler 608 non-uniformly scales the curve in a single direction. In general, the non-uniform scaler 608 scales the curve perpendicularly to the axis of the canonical coordinate system on which the curve starts and ends. For example, if the curve is starts and ends on the x-axis, the non-uniform scaler 608 will scale the curve in the y-direction.

In one or more embodiments, the non-uniform scaler 608 scales the curve based on a scaling factor s. In particular, the curve enhancement system can non-uniformly scale a point (x,y) in a curve by scaling only the y-coordinate so the resulting point is (x,s×y) for scale factor s<1. In some embodiments, the scaling factor is a variable scaling factor and dependents upon the x-coordinate. In other words, the curve enhancement system can apply a different scaling factor for each curve primitive and/or point in a curve.

The CVC curve generator 610, in general, generates CVC curves based on the non-uniformed scaled curve. More specifically, the CVC curve generator 610 generates CVC curves and end point constraints based on the non-uniformed scaled curve, which provide conditions that enable the curve enhancement system 602 to generate enhanced curves and lines.

In one or more embodiments, the CVC curve generator 610 uses oscillating circles to compute end point constraints for the CVC curves. As described above, an oscillating circle can be non-uniformly scaled along with the curve in a single direction to form a non-uniformly scaled ellipse to obtain the enhanced angle and curvature of the enhanced curves. The CVC curve generator 610 can then stretch or round the non-uniformly scaled ellipse back into a stretched oscillating circle, while maintaining the enhanced angle and curvature of the enhanced curves. As such, the stretched oscillating circle can share the similar parameters as the desired end point constraints, including a starting point (or ending point), direction, and curvature.

The curve downscaler 612 downscales the non-uniformly scaled curve. The curve downscaler 612 applies an inverted scaling factor to the non-uniformly scaled curve. Further, while downscaling non-uniformly scaled curve, the curve downscaler 612 maintains the end point constraints from the CVC curves. In this manner, the curve downscaler 612 generates an enhanced curve having the enhanced curves.

In some embodiments, the curve downscaler 612 computes an inverted scaling factor that is inversely proportionate to the scaling factor used to non-uniformly scale the curve. For example, if the scaling factor is $Y_{S0}$ and $Y_{S1}$, the inverted scaling factor is $1/Y_{S0}$ and $1/Y_{S1}$. As such, the inverted scaling factor can also be variable based on the x-coordinate, as previously described.

In one or more embodiments, where stretched oscillating circles are used, the curve downscaler 612 downscales the stretched oscillating circles. For example, the curve downscaler 612 applies an inverted scaling factor to the stretched oscillating circles for the enhanced curve at (0,0) and (1,0) respectively. In downscaling the stretched oscillating circles, the curve downscaler 612 preserves the enhanced angle and curvature of the enhanced curve because downscaling the radius of the stretched oscillating circles does not alter the angle or curvature of the stretched oscillating circles. As such, the curve downscaler 612 may use the downscaled osculating circles to maintain the end points constraints found using the CVC curves. In particular, the curve transformer 606 uses the downscaled osculating circles and inverted scaling factor to likewise downscale the non-uniformly scale the curve into an enhanced curve while maintaining the enhanced curves based on the downscaled osculating circles.

In some embodiments, the curve transformer 606, described above, retransforms the enhanced curve from the canonical coordinate system back to the original coordinate system. For example, the curve transformer 606 can rotate the enhanced curve to match the original orientation of the pre-enhanced curve. Thus, if the pre-enhanced curve was at a 47-degree angle, the curve transformer 606 can rotate the enhanced curve to 47 degrees. Further, the curve transformer 606 can ensure that the starting point (e.g., the first end point) and the ending point (e.g., the second end point) of the enhanced curve match the starting point and the ending point of the pre-enhanced curve in the original coordinate system.

As shown in FIG. 6, the curve enhancement system 602 includes the Bézier curve fitter 614. The Bézier curve fitter 614 may be optional in some embodiments. For example, the curve enhancement system generates enhanced lines and a separate system may perform Bézier curve fitting. Alternatively, the curve enhancement system 602 may directly provide one or more CVC curves to a drawing application or rendering program. Further, the curve enhancement system 602 may use another type of curve to represent an enhanced curve.

As briefly described above, and as described in detail below, the Bézier curve fitter 614 can fit a single Bézier curve or multiple Bézier curves to the CVC curves. The Bézier curve fitter 614 can fit one or more Bézier curves to the CVC curves before or after downscaling. For example, the Bézier curve fitter 614 fits a Bézier curve to the CVC curves before, and the curve downscaler 612 downscales the fitted Bézier curve to generate an enhanced Bézier curve. Alternatively, the Bézier curve fitter 614 fits a Bézier curve to the enhanced CVC curves after the curve downscaler 612 downscales the CVC curves to generate an enhanced Bézier curve.

As mentioned above, Bézier curve are industry standard and as such, are more common in the drawing and design industry than CVC curves. As a result, design applications often read and render Bézier curves. In contrast, CVC curves are not as common, and many design applications may not be able to read or render CVC curves properly. Thus, fitting a Bézier curve to the generated enhanced curve allows the enhanced curve to be universally displayed. In the manner, the Bézier curve fitter 614 enables an enhanced curve to be easily rendered by drawing and design applications.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The term "digital environment," as used herein, generally refers to an environment that is implemented, for example, as a stand-alone application (e.g., a personal computer or mobile application running on a computing device), as a module of an application, as a plug-in for an application, as a library function or functions that may be called by a network application creation system, and/or as a cloud-computing system. A digital medium environment allows users to create, view, and/or edit drawings and sketches that include enhanced curves and/or lines.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
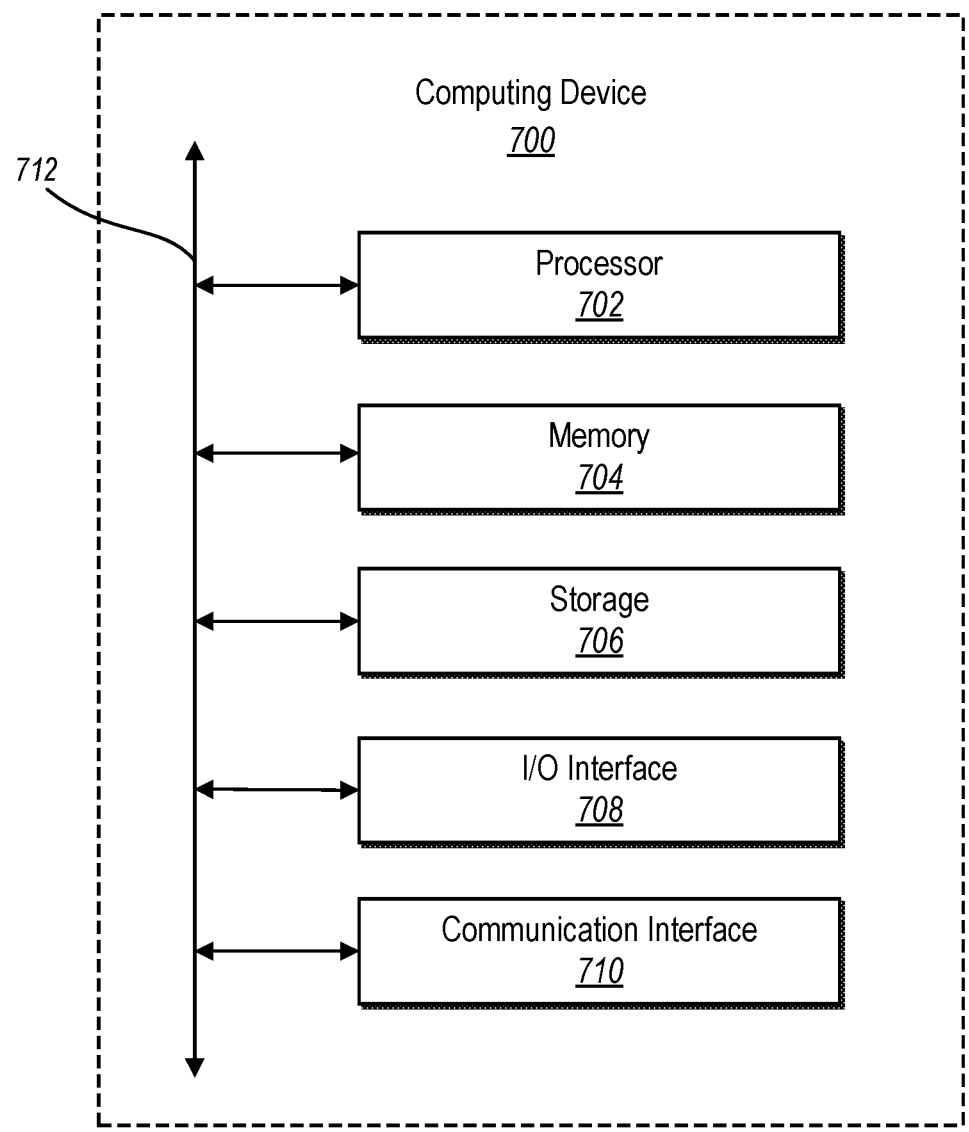
FIG. 7 illustrates a block diagram of an exemplary computing device in accordance with one or more embodiments.

FIG. 7 illustrates a block diagram of an exemplary computing device 700 that may be configured to perform one or more of the processes described above. One will appreciate that one or more computing devices, such as the computing device 700 may host the curve enhancement system 602. As shown by FIG. 7, the computing device 700 can comprise a processor 702, memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In particular embodiments, processor(s) 702 includes hardware for executing instructions, such as those making up a computer program. As an example and not by way of limitation, to execute instructions, processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The computing device 700 includes a storage device 706 includes storage for storing data or instructions. As an example and not by way of limitation, storage device 706 can comprise a non-transitory storage medium described above. The storage device 706 may include a hard disk drive (HDD), flash memory, a Universal Serial Bus (USB) drive or a combination these or other storage devices.

The computing device 700 also includes one or more input or output ("I/O") devices/interfaces 708, which are provided to allow a user to provide input to (such as user strokes), receive output from, and otherwise transfer data to and from the computing device 700. These I/O devices/interfaces 708 may include a mouse, keypad or a keyboard, a touch screen, camera, optical scanner, network interface, modem, other known I/O devices or a combination of such I/O devices/interfaces 708. The touch screen may be activated with a stylus or a finger.

The I/O devices/interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device and one or more other computing devices 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 can comprise hardware, software, or both that couples components of computing device 700 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital environment rendering spline-based designs, a method of enhancing curves, the method comprising:

detecting, by at least one processor, user input defining points of at least a portion of a spline;

non-uniformly scaling, by the at least one processor, a curve in the spline in a single direction;

identifying, by the at least one processor, end point constraints comprising a starting curvature and an ending curvature from the non-uniformly scaled curve;

computing, by the at least one processor, multiple cubic variation of curvature (CVC) curves corresponding to the identified end point constraints; and downscaling, by the at least one processor, the multiple CVC curves while maintaining the starting curvature and the ending curvature from the non-uniformly scaled curve to generate an enhanced curve in the spline.

2. The method as recited in claim 1, further comprising:

locating a starting point of the curve at an origin of a canonical coordinate system;

rotating the curve with the canonical coordinate system such that the curve is horizontal with a horizontal axis of the canonical coordinate system; and scaling the curve within the canonical coordinate system such that an ending point of the curve is at a first unit along the horizontal axis of the canonical coordinate system.

3. The method as recited in claim 2, wherein non-uniformly scaling in the single direction is further based on a vertical value of the curve within the canonical coordinate system along the horizontal axis.

4. The method as recited in claim 1, wherein downscaling the multiple CVC curves comprises downscaling the multiple CVC curves inversely proportionate to the non-uniform scaling.

5. The method as recited in claim 1, further comprising fitting a single Bézier curve to the enhanced curve.

6. The method as recited in claim 5, wherein the single Bézier curve is fit to the enhanced curve without requiring the curvature of the Bézier curve to exactly match the end points of the enhanced curve.

7. The method as recited in claim 1, further comprising fitting a single Bézier curve to the multiple CVC curves.

8. The method as recited in claim 1, wherein the curve has a set of interpolated control points, wherein a tangent and a curvature are specified for each interpolated control point in the set of interpolated control points, and wherein computing the multiple CVC curves comprises using curve primitives of the curve to construct each of the multiple CVC curves between the set of interpolated control points.

9. A non-transitory computer readable medium storing computer instructions that, when executed by at least one processor, cause a computing device to render spline-based designs based on user input by performing steps comprising:

constructing a spline through a set of interpolated control points, where a tangent angle and a curvature are specified at each interpolated control point, using cubic variation of curvature (CVC) curve primitives to construct a CVC curve between each adjacent pair of interpolated control points using the curvature and angle by:

non-uniformly scaling the curvature and angle for each interpolated control point by a non-uniform scaling factor to generate an upscaled CVC curve;

identifying end point constraints comprising a starting curvature and an ending curvature from the upscaled CVC curve; and downscaling the upscaled CVC curve using a downscaling factor inversely proportional to the non-uniform scaling factor while maintaining the starting curvature and the ending curvature from the upscaled CVC curve; and rendering, by the at least one processor, curve primitives comprising the spline.

10. The non-transitory computer readable medium as recited in claim 9, further comprising instructions that, when executed by the at least one processor, cause the computing device to perform fitting a Bézier curve to the downscaled CVC curve, and wherein rendering the spline comprises rendering the fit Bézier curve.

11. The non-transitory computer readable medium as recited in claim 9, further comprising instructions that, when executed by the at least one processor, cause the computing device to perform fitting a Bézier curve to the upscaled CVC curve prior to downscaling the upscaled CVC curve.

12. The non-transitory computer readable medium as recited in claim 9, further comprising instructions that, when executed by the at least one processor, cause the computing device to perform calculating the tangent angle and the curvature for each interpolated control point using a quadratic kCurve algorithm.

13. The non-transitory computer readable medium of claim 9, further comprising instructions that, when executed by the at least once processor, cause the computing device to perform transforming the CVC curve primitives to a canonical coordinate system by translating, rotating, and scaling the CVC curve primitives.

14. The non-transitory computer readable medium of claim 9, further comprising instructions that, when executed by the at least one processor, cause the computing device to perform calculating the scaling factor based on a non-linear blending function as a function of two end points.

15. The non-transitory computer readable medium of claim 9, wherein identifying end point constraints further comprises identifying a starting direction and an ending direction.

16. The non-transitory computer readable medium of claim 9, further comprising instructions that, when executed by the at least one processor, cause the computing device to further perform:
identifying an arc length of the curve;
calculating a radius of a tangential oscillating circle adjacent to an end point of the end points of the CVC curve;
determining that a radius of the tangential oscillating circle is less than one-sixth of an arc length of a curve of the CVC curve; and
based on the determination, non-uniformly scaling the curvatures and angles.

17. The non-transitory computer readable medium as recited in claim 9, wherein the end point constraints from the upscaled CVC curves are curvature continuous such that tangent angles and curvatures of the curve primitives of the spline beginning at end points of the upscaled CVC cures match at a joining point between the upscaled CVC curves.

18. In a digital environment for receiving input from a user and rendering spline-based designs based on user input, a system of enhancing curves, the system comprising:
at least one processor; and
at least one non-transitory computer readable storage medium storing instructions that, when executed by the at least one processor, cause the system to:
detect user input defining end points of at least a portion of a spline;
transform the end points of a curve in the spline from a first orientation to a second orientation within a canonical coordinate system to align the end points with the canonical coordinate system;
non-uniformly scale the end points of the curve by non-uniformly scaling one or more curve primitives in the curve in a single direction;
compute multiple cubic variation of curvature (CVC) curves corresponding to the non-uniformly scaled curve;
identify end point constraints from the multiple CVC curves corresponding to the non-uniformly scaled curve;
downscale the non-uniformly scaled curve while maintaining the end point constraints from the multiple CVC to generate an enhanced curve; and
rotate the enhanced curve back to the first orientation.

19. The system of claim 18, wherein the end point constraints from the multiple CVC curves are curvature continuous such that tangent angles and curvatures of curve primitives beginning at end points of the multiple CVC cures match at a joining point between the multiple CVC curves.

20. The system of claim 18, further comprising instructions that, when executed by the at least one processor, cause the system to fit one or more Bézier curves to the enhanced curve.

* * * * *